United States Patent [19]

Lopez

[11] Patent Number: 5,601,265
[45] Date of Patent: Feb. 11, 1997

[54] DEVICE FOR LOCKING AN APPARATUS ON A SUPPORT NOTABLY A CAMERA ON A TRIPOD

[75] Inventor: Rene-Serge Lopez, Le Plessis Bouchard, France

[73] Assignee: Thomson Broadcast, Cergy-Pontoise Cedex, France

[21] Appl. No.: 429,858

[22] Filed: Apr. 27, 1995

[30] Foreign Application Priority Data

May 17, 1994 [FR] France .................................. 94 05988

[51] Int. Cl.⁶ .................................................. F16M 11/02
[52] U.S. Cl. ........................................ 248/177.1; 352/243
[58] Field of Search ............................. 248/177.1, 176.1, 248/681, 680, 187, 222.12; 352/243; 354/293, 80, 81; 70/58

[56] References Cited

U.S. PATENT DOCUMENTS

| | | |
|---|---|---|
| 2,966,107 | 12/1960 | Sanderson . |
| 3,416,822 | 12/1968 | Zimmer . |
| 3,693,921 | 9/1972 | Beaucher ................................ 248/187 |
| 4,057,816 | 11/1977 | Killian, Jr. et al. ................. 248/187 X |
| 4,466,595 | 8/1984 | O'Connor .......................... 248/187 X |
| 4,657,216 | 4/1987 | Southgate ............................... 248/187 |
| 4,979,709 | 12/1990 | Ishikawa ................................ 248/187 |
| 5,429,332 | 7/1995 | Ishikawa ........................... 352/243 X |

Primary Examiner—Ramon O. Ramirez
Attorney, Agent, or Firm—Oblon, Spivak, McClelland, Maier & Neustadt, P.C.

[57] ABSTRACT

A device for locking any apparatus on any support, notably a device enabling simple locking of a camera on a support such as a tripod. The device includes two attachment fittings that engage two hooking parts attached to the apparatus, wherein the attachment fittings are locked in their engaged position when two push-buttons fitted in the top plate of the support are both depressed under the weight of the apparatus. The two attachment fittings, linked together and spring-loaded, slide simultaneously to engage the two hooking parts.

8 Claims, 2 Drawing Sheets

DEVICE FOR LOCKING AN APPARATUS ON A SUPPORT NOTABLY A CAMERA ON A TRIPOD

BACKGROUND OF THE INVENTION

1. Field of the Invention

The invention concerns a device for locking any apparatus on any support, notably a device enabling simple locking of a camera on a support such as a tripod.

2. Discussion of the Background

A professional television cameraman must be able to operate a camera resting on his shoulder, or mount it rapidly and easily on a tripod or other support. The fixing system must be totally reliable in view of the risk of damage to cameras, which are complex, fragile and costly, in the event of dropping.

Known camera mounts generally make use of two attachment points, one at the front and one at the rear, an arrangement imposed by the need to leave an smooth surface in the middle of the camera for the comfort of the cameraman taking shoulder shots. The camera is placed on the mount by the operator, then guided by rails to a front attachment point where the camera is locked in the horizontal plane when it reaches the front stop. The rear attachment point, usually spring-mounted, must lock the camera in the vertical plane. Some camera locking systems currently in use do not fully guarantee locking at the front (i.e. the camera not being fully engaged at the end of the guide rails) or at the rear (i.e. being difficult to be sure that the lock is engaged). Incomplete locking can lead to serious accidents to personnel or equipment. Furthermore, with known locking systems, even when the camera is correctly locked in place on the mount, it may become unlocked during use.

SUMMARY OF THE INVENTION

The present invention overcomes these serious shortcomings and provides for quick and reliable locking. The invention enables foolproof, solid, easy locking and is also simple and inexpensive.

The object of the invention is to provide a device for locking an apparatus on a support, notably a camera on a tripod, including two attachment fittings that engage two hooking parts attached to the apparatus, wherein the locking action is produced when two push-buttons fitted in the top plate of the device are both depressed by the weight of the apparatus. Moreover this device can be attached to the support in any known manner, possibly also by making use of the weight of the apparatus. The two attachment fittings, one at the front and the other at the rear, are spring loaded and linked to each other by tie-rods. They therefore slide simultaneously, engaging the hooking parts at the front and rear of the apparatus. The push-buttons are spring-loaded, and their special shape (at least two different diameters along their length) enables the attachment fittings to be held in their "unlocked" position when the apparatus is lifted off the top plate. The attachment fittings move to their locked position when both the push-buttons are depressed.

The attachment fittings are moved into their "unlocked" or disengaged configuration by manually sliding the rigid, spring-loaded system on which they are mounted such that the hooking parts on the apparatus are disengaged, then lifting the apparatus off the support, allowing the push-buttons to move into the position where they hold the system in this "unlocked" configuration.

The locking device according to the invention is highly reliable since no locking whatsoever of the apparatus can be achieved until both push-buttons are depressed simultaneously. This depression is easily achieved using the weight of the apparatus. Moreover, the design of the unlocking system is such that it is impossible for the apparatus to become unlocked as long as it left on the top plate of the device according to the invention.

BRIEF DESCRIPTION OF THE DRAWINGS

The invention will be better understood and other advantages will become clear on reading the following description making reference to the appended figures, of which.

DESCRIPTION OF THE PREFERRED EMBODIMENTS

The embodiment of the device according to the invention illustrated by these figures concerns the locking of a camera on a tripod, which is used only as an example. It is obvious that the invention can be adapted for the fixing of any type of apparatus on any type of support.

Figure 1:
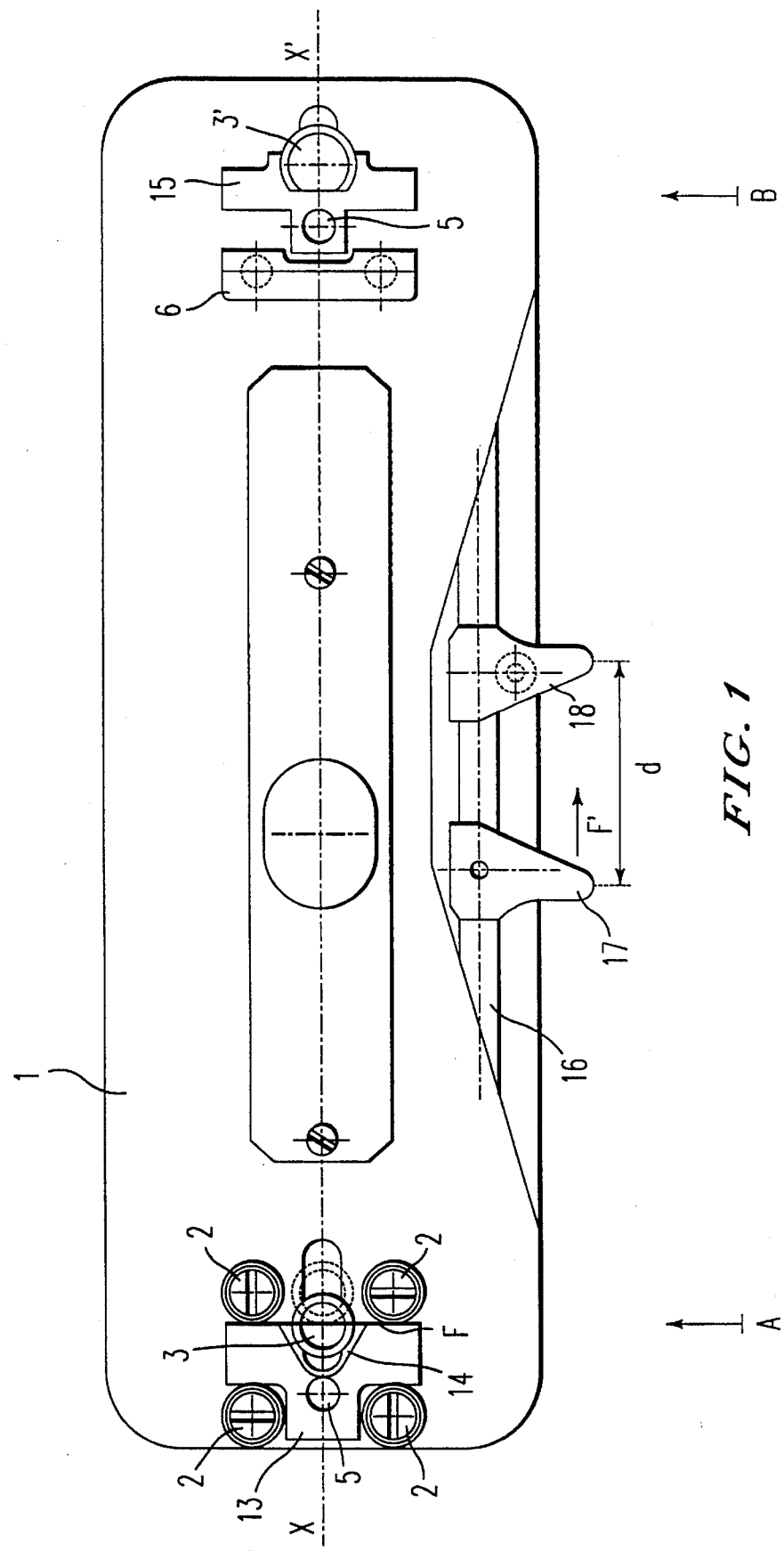
FIG. 1 shows part of the locking device according to the invention in locked position.

The embodiment shown in FIG. 1 comprises a top plate 1 of the fixing device, including some of the parts of the device according to the invention, the other parts being attached to the camera. This top plate 1 includes on its front section A several means 2 attached rigidly to the top plate 1 and assuring the centering and horizontal positioning of the camera in the plane of the top plate 1. These means of centering 2 are preferably four chamfered guide pins, but can be any other means of centering. The front section A of the top plate 1 also includes a locking claw 3 which can slide along the axis xx' of the top plate 1 when the locking is activated by pressing the front and rear push-buttons 5 mounted in the top plate 1. It is advantageous that the locking claw 3 is chamfered or rounded to facilitate its engagement of the corresponding part of the camera and to hold the camera firmly against the top plate.

Figure 2:
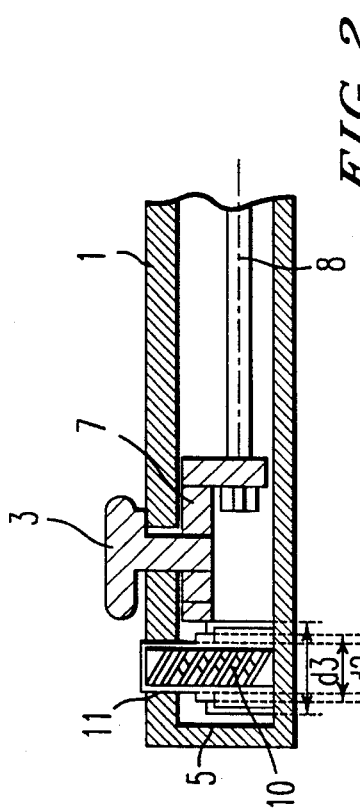
FIG. 2 shows a sectional view of one of the push-buttons controlling the system of locking and unlocking.
Figure 3:
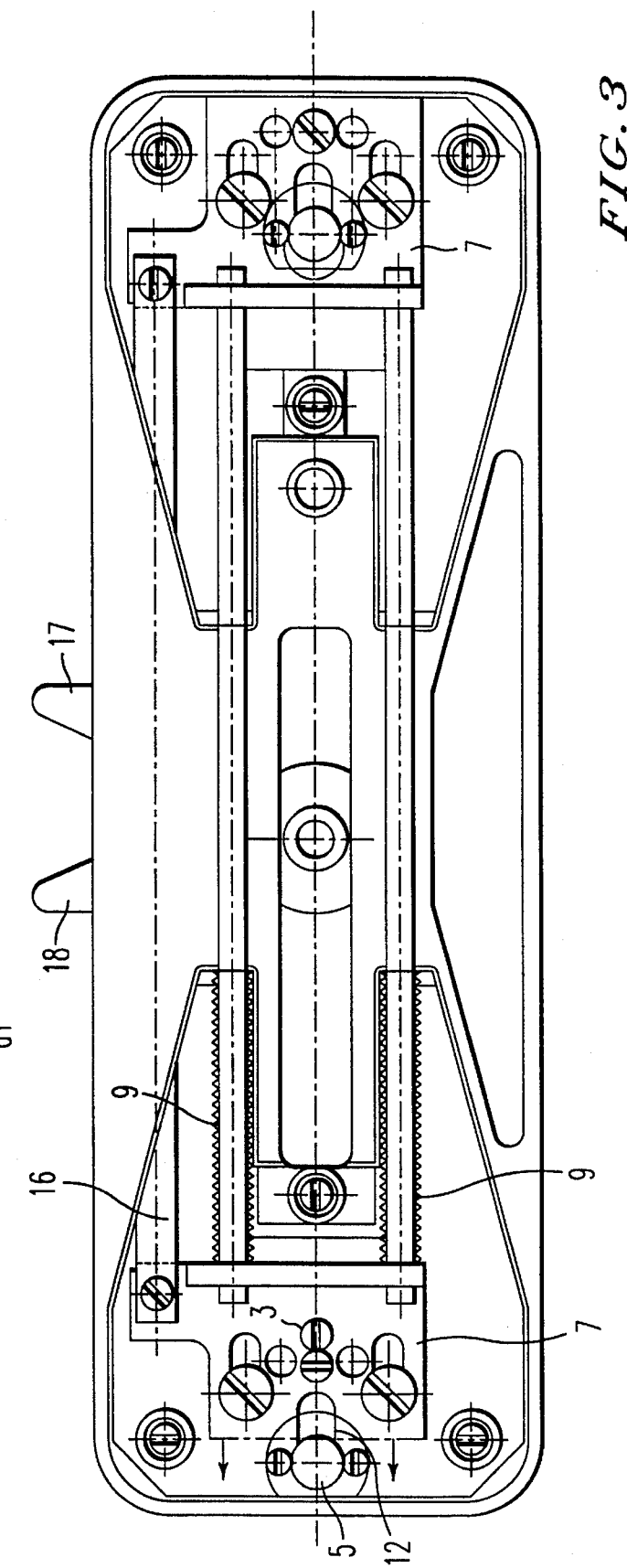
FIG. 3 shows the system of linkage between the front and rear attachment fittings of the device in locked position.

The locking achieved by depressing the two push-buttons 5 simultaneously is one of the main features of the invention. These two push-buttons 5 activate the front and rear locking mechanisms, the latter consisting of a locking claw 3' of the same type as the front locking claw 3. The rear section B of the top plate 1 also includes a push-button 5 of the same type as that in the front section A, and also a lateral stop 6 which enables the centering of the hooking part at the rear part of the camera which is designed to be engaged by the locking claw 3'. in order to link the front and rear attachment fittings, the locking claws 3 and 3' are attached to intermediate parts 7 in the form of brackets, which are connected by two tie-rods 8 spring-loaded by springs 9. As shown in FIGS. 2 and 3, the locking of this system is achieved by simultaneous depression of the push-buttons 5.

These push-buttons 5 are depressed by the weight of the camera as it is placed on the top plate 1 by the operator. In FIG. 2 we see that these push-buttons are in the form of studs having several diameters d1, d2 and d3 (d2 being optional). When the device is unlocked, i.e. when the camera is not resting on the top plate 1, the push-buttons 5 protrude from the top plate 1, under the pressure of springs 10, through a hole 11 whose diameter is greater than the smallest diameter d1 of the pins 5 but less than the diameter d2, so that the push-button is stopped against the top plate 1 by its diameter d2. The brackets 7 to which the locking claws 3 and 3' are attached, held under tension by springs 9, each have a slot 12 whose length is at least equal to the travel required in the locking claws 3 and 3' for them to engage and lock the camera, and whose width is less than the diameter d3 of the push-buttons 5 but larger than the two other diameters d1 and d2. When the push-buttons 5 are in their upper position the locking claws are pressed by the springs 9 against the largest diameter d3 of the push-buttons 5. When the camera is lowered onto the top plate 1 it is guided and centered by the guide pins 2 and the centering stop 6. Its weight pushes down the push-buttons 5 against the force of the springs 10 until the smaller diameters d1 of the push-buttons align with the slots 12 in the brackets 7. These diameters d1 being smaller than the width of the slots 12, the rigid mechanism comprising the two brackets 7, the locking claws 3 and 3' and the tie-rods 8 slides towards the front (in the direction of arrow "F") thus engaging the hooking parts on the camera and holding the camera against the top plate 1.

The push-buttons 5 can be hollow in order to fit the compression springs 10 inside them.

FIG. 1 shows the two hooking parts 13 and 15, attached to the lower surface of the camera in contact with the top plate 1, which are engaged by the locking claws 3 and 3' respectively. The camera itself is not shown, for reasons of clarity.

The front hooking part 13 (which also assures the centering of the camera in association with the centering pins 2) includes a cut-out 14 (or recess) which can be engaged by the suitably shaped locking claw 3 when this slides into its locked position. Similarly the rear hooking part 15 of the camera in contact with the rear attachment fitting assures the centering of the rear of the camera in association with the centering stop 6 and has a shape that can be engaged by the rear locking claw 3'. In order for the two locking claws to engage these parts 13 and 15 on the camera, the latter must be completely pressed against the top plate 1 so as to depress the push-buttons 5. This eliminates any possibility of partial locking, since the pressure on only one of the two push-buttons 5 does not allow the locking system to slide into locked position because the other push-button remains in its "unlocked" (upper) position blocking the whole rigid mechanism comprising the two brackets 7, the tie-rods 8 and the locking claws 3 and 3'.

The ability to lock the camera simply by lowering it (the centering and locking of the camera being assured automatically by the guide pins 2 and the weight of the camera respectively), rather than sliding it as in the prior art, is an advantage since this avoids scratching or jolting of the camera. Furthermore, the centering and locking of the camera can be achieved without looking, since the camera is naturally guided by the guide pins 2 and the centering stop 6 and locking is activated by the weight of the camera and is only completed once the camera is fully centered and pressed against the top plate 1.

Another important feature of the device according to the invention is concerns the unlocking system enabling the camera to be removed from the support. As shown in FIG. 3, a third tie-rod 16 (which could be one of the two tie-rods 8) links the two brackets 7. A knob 17 is attached to this third tie-rod 16. A second knob 18 is attached rigidly to the top plate 1 adjacent to the knob 17. To remove the camera from the top plate the operator squeezes the knob 17 towards the knob 18, which moves the brackets 7 linked by the tie-rod 16 towards the rear, compressing the springs 9. This action disengages the front and rear locking claws 3 and 3' from the camera hooking parts 13 and 15. The movement of the slots 12 towards the rear liberates the push-buttons 5 from the slots. Lifting of the camera off the top plate 1 allows the push-buttons 5 to move upwards under the pressure of the springs 10, thus locking the brackets 7 along with the locking claws 3 and 3' in the unlocked position. The two knobs 17 and 18 used to unlock the system are separated by a distance d suitably chosen to enable them to be operated by two fingers of one hand, thus leaving the other hand free to lift the camera off the top plate 1.

One of the advantages of the unlocking system according to the invention is that as long as the camera remains on the top plate 1 the push-buttons 5 can not move upwards to unlock the system, and the springs 9 ensure that the locking claws 3 and 3' are pushed into their engaged positions. Only the combined action of moving the release knobs 17 and 18 together and lifting the camera off the top plate 1 can leave the system in its unlocked configuration. It is thus impossible leave the camera in unlocked position while it is resting on the support, which is a considerable safety advantage. Furthermore, once the camera is locked on its support no projecting parts which might catch on clothes, cables, etc. are visible.

The locking device according to the invention is applicable to all types of apparatus mounted on all types of mobile or static supports, in particular portable cameras or projectors which require to be locked onto supports on the walls or ceiling of a studio.

What is claimed is:

1. Device for locking an apparatus on a support, comprising:

two hooking parts which are attachable to the apparatus, a top plate equipped with two attachment fittings, said fittings being engageable with said two hooking parts, and two push-buttons fitted in said top plate, said two push-buttons allowing said two attachment fittings to slide simultaneously and to engage said two hooking parts.

2. Device according to claim 1, wherein said attachment fittings comprising locking claws.

3. Device according to claim 2, wherein said locking claws are linked together and spring-loaded and wherein said locking claws are slidable in the plane of said top plate.

4. Device according to claim 1, wherein said push-buttons respectively comprise studs which are spring loaded and positioned perpendicular to the top plate, said studs having at least two different diameters along their length, and which, depending on the position thereof, serve to hold said attachment fittings in a disengaged position or lock said fittings in an engaged position.

5. Device according to claim 1, wherein said push-buttons are depressible by the weight of the apparatus.

6. Device according to claim 1, wherein said attachment fittings include centering pins requiring the apparatus to be lowered vertically onto said top plate to be locked onto said top plate.

7. Device according to claim 2, which comprises a rigid system carrying the locking claws so that the apparatus is unlockable from the support by manually sliding.

8. Device according to claim 1, wherein the apparatus comprises a camera and the support comprises a tripod.

* * * * *